United States Patent
Dove

(10) Patent No.: US 7,921,306 B2
(45) Date of Patent: *Apr. 5, 2011

(54) METHOD AND SYSTEM FOR DISTRIBUTING POWER TO NETWORKED DEVICES

(75) Inventor: Daniel J. Dove, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1084 days.

This patent is subject to a terminal disclaimer.

(21) Appl. No.: 11/707,682

(22) Filed: Feb. 16, 2007

(65) Prior Publication Data

US 2008/0077811 A1 Mar. 27, 2008

Related U.S. Application Data

(63) Continuation of application No. 10/734,665, filed on Dec. 12, 2003, now Pat. No. 7,203,849.

(51) Int. Cl.
*G06F 1/26* (2006.01)
*G06F 1/28* (2006.01)
*G06F 1/30* (2006.01)

(52) U.S. Cl. ........ 713/300; 713/310; 713/320; 713/321; 713/322; 713/323; 713/324; 713/330; 713/340

(58) Field of Classification Search .................. 713/300, 713/310, 330, 340, 320–324; 700/286, 295, 700/297

See application file for complete search history.

(56) References Cited

U.S. PATENT DOCUMENTS

| 5,483,656 A * | 1/1996 | Oprescu et al. ............... 713/320 |
| 7,203,849 B2 * | 4/2007 | Dove ............................ 713/300 |
| 7,286,556 B1 * | 10/2007 | Jackson ........................ 370/445 |
| 2004/0095933 A1 * | 5/2004 | Lehr et al. .................... 370/389 |
| 2004/0230846 A1 * | 11/2004 | Mancey et al. ............... 713/300 |

* cited by examiner

*Primary Examiner* — Thomas Lee
*Assistant Examiner* — Fahmida Rahman

(57) ABSTRACT

One embodiment disclosed relates to a system for power distribution to network devices. The system includes a plurality of network switches each having an internal power supply and a plurality of ports for connecting to the network devices and an external power supply having a plurality of output ports for connecting to the network switches. The external power supply communicates power available to the network switches. Each network switch determines amounts and priority levels of power for the network devices connected thereto, sums together the amounts at each priority level, determines additional amounts and priority levels of power required beyond the internal power supply capability, and sends a power request to the external power supply. The external power supply allocates power to the network switches depending on the power requests received.

15 Claims, 6 Drawing Sheets

200

METHOD AND SYSTEM FOR DISTRIBUTING POWER TO NETWORKED DEVICES

CROSS-REFERENCE TO RELATED APPLICATIONS

The present application is a continuation of U.S. patent application Ser. No. 10/734,665, now U.S. Pat. No. 7,203,849, entitled "Method and System for Distributing Power to Networked Devices, filed Dec. 12, 2003 by Daniel J. Dove. The disclosure of the aforementioned application is hereby incorporated by reference.

BACKGROUND OF THE INVENTION

1. Field of the Invention

The present invention relates generally to networking and communications technology.

2. Description of the Background Art

Power over LAN™ or Power over Ethernet, is a new technology that enables DC power to be supplied to Ethernet data terminals over ordinary local area network (LAN) cabling such as Category 5 cabling. This technology enables the terminals, termed powered devices (PDs), to receive their operating power over the same Ethernet LAN connection that they use for data communication. It thus eliminates the need to connect each terminal to an AC power socket, and the need to provide each terminal with its own AC/DC power converter. The technology also enables PDs to be recognized as such by a "signature" generated by the terminal. The LAN MAN Standards Committee of the IEEE Computer Society is developing specifications for Power over LAN systems, as described in IEEE Drafts P802.3af/D3.0 or later, entitled "Data Terminal Equipment (DTE) Power via Media Dependent Interface (MDI)" (IEEE Standards Department, Piscataway, N.J., 2001), which is also incorporated herein by reference. The specifications are referred to herein as standard 802.3af.

A Power over LAN system comprises an Ethernet switch and a power hub, which serves as the DC power source, along with a number of PD terminals, which communicate via the switch and draw power from the hub. The system is typically connected in a star topology, with each terminal linked by a cable to the switch and hub. The power hub in one chassis may be integrated with the switch in a second chassis, in a console containing both chassis, in what is known as an "end-span" configuration. Alternatively, the power hub chassis may be located between the switch chassis and the terminals, in a "mid-span" configuration. DC power is carried to the loads (i.e., the terminals) over twisted pairs provided by Category 5 cabling. The end-span configuration uses twisted-data-pairs that are also used for Ethernet communication; the mid-span configuration uses spare twisted-spare-pairs that are not used for Ethernet communication.

SUMMARY

One embodiment of the invention pertains to a system for power distribution to network devices. The system includes a plurality of network switches each having an internal power supply and a plurality of ports for connecting to the network devices and an external power supply having a plurality of output ports for connecting to the network switches. The external power supply communicates power available to the network switches. Each network switch determines amounts and priority levels of power for the network devices connected thereto, sums together the amounts at each priority level, determines additional amounts and priority levels of power required beyond the internal power supply capability, and sends a power request to the external power supply. The external power supply allocates power to the network switches depending on the power requests received.

Another embodiment of the invention pertains to a method of power distribution to network devices. Amounts and priority levels of power are determined for the network devices connected to each power distributor of a plurality of power distributors. The amounts at each priority level are summed together at each power distributor, and a determination is made of additional amounts and priority levels of power required beyond an internal power supply capability of each power distributor.

In another embodiment, the method of distributing power to network devices maintaining in the switch a table of the amount and priority level for each switch port. The table is used to allocate available power to higher priority devices when insufficient power is available to fully power all of the connected devices.

DETAILED DESCRIPTION

Figure 1:
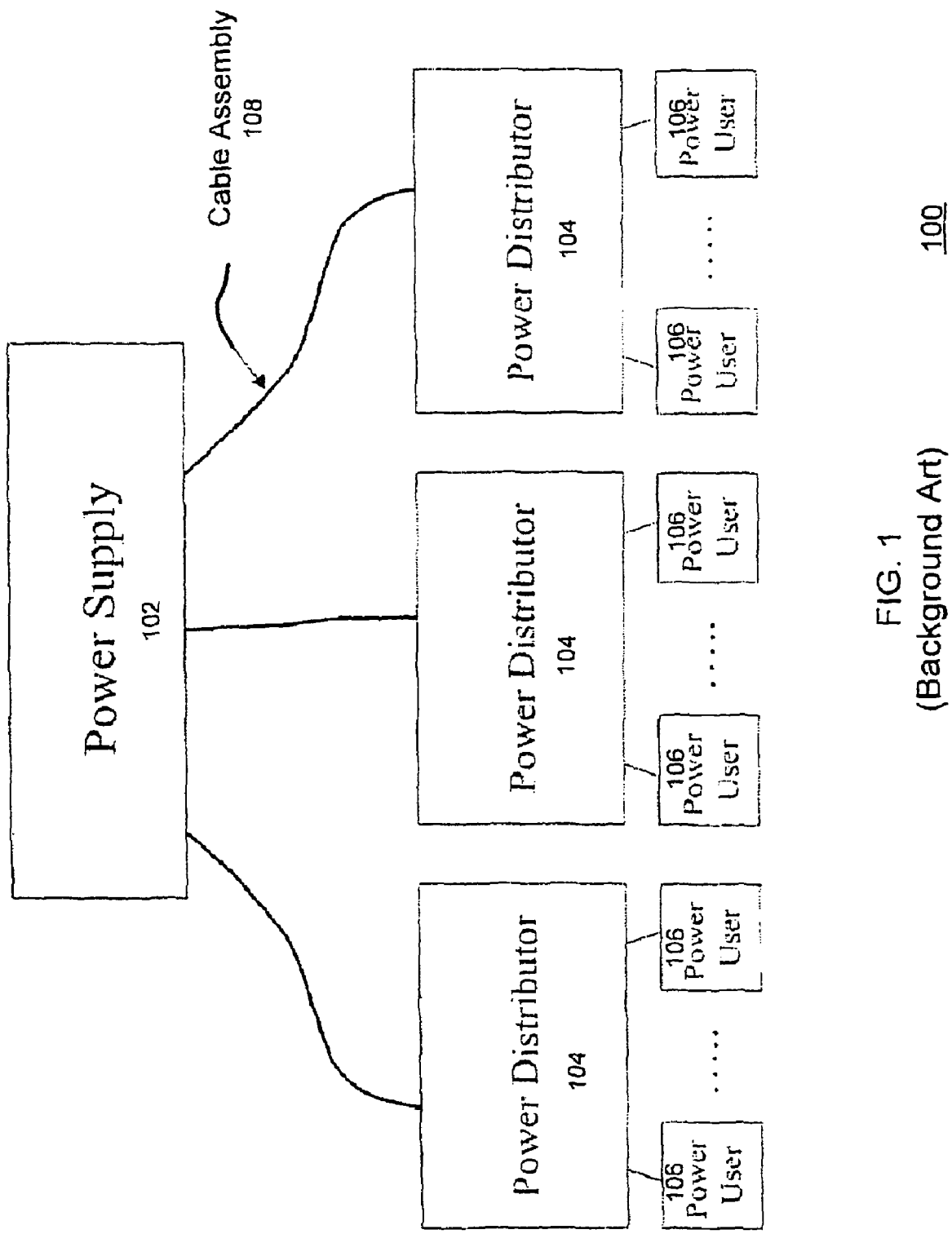
FIG. 1 is a block diagram depicting a conventional system for distributing power.

FIG. 1 is a block diagram depicting a conventional system 100 for distributing power. The conventional system 100 includes a conventional external power supply 102, multiple conventional power distributors 104 coupled to the power supply 102, and multiple power user devices 106 coupled to each power distributor 104. The external power supply 102 and the power distributors 104 are connected by way of a conventional cable assembly 108.

The conventional power supply 102 typically distributes an equal amount of power to each power distributor 104 (load) connected thereto. This may be accomplished by either current sense and sharing, or by separate supplies within the box. The conventional cable assembly 108 typically provides power and return wires. For power-sharing purposes, a sense-signal line may be provided. The sense signal may comprise a low-current analog signal generated using low-impedance circuitry. The sense signal is an indication of the load due to the associated power distributor 104.

Similarly, the conventional power distributor 104 typically distributes an equal amount of power to each power user device 106 (load) connected thereto. Again, this may be accomplished by either current sense and sharing, or by separate supplies within the box. The power user devices 106 comprise loads which "demand" power from the power distributors 104 without any intelligent prioritization.

The conventional external supply 102 has a mechanism to protect itself if it is overloaded. If the load is too high, then the power supply 102 may "crowbar" to avoid damage from being overloaded. A crowbar circuit is an overvoltage protection mechanism which, when a voltage limit is exceeded, may shunt a low resistance across the power supply output terminals.

In contrast to the conventional system, an embodiment of the present invention comprises a novel power distribution system where a protocol allows the recipients of the power to indicate their requested amounts of power and priority levels thereof. The power source evaluates the power demand from the multiple recipients and balances the power demands against the available power so as to optimize the power distribution on a prioritized basis. The algorithm used by the power source is such that a device deemed "higher priority" will be given power over another device that is defined as a "lower priority." The power source replies back with an indication of allowed power usage to each recipient.

One embodiment of the invention provides a unique solution to a general problem in the "Power over Ethernet" (PoE) technology space. PoE systems are required to provide up to 15 watts per port even though many devices do not require that amount of power. For example, a 48 port switch under PoE would conventionally provide 15 watts per port so would need a 720 watt power supply. The cost of such a 720 watt supply and the packaging, air flow, and so on, to support that large of a supply is quite expensive. This problem is advantageously overcome in an intelligent way using embodiments of the present invention so as to provide power flexibly with an under-provisioned power system (i.e. a system without full capacity to guarantee full power to all ports at all times.)

For example, one embodiment of the present invention comprises multiple intelligent PoE switches to be connected to a single intelligent external power supply (EPS), where the total power capacity of the switches and EPS is less than the theoretical maximum required (i.e. less than 15 watts times the number of ports for user devices). The system of the present invention intelligently allocates the available power capacity of the EPS to the various switches connected thereto. For instance, suppose a first switch wants 250 watts of power from the EPS and a second switch only needs 50 watts of power from the EPS. Power can be requested for each switch up to a point that would exceed the maximum total supply of the EPS, then the algorithm limits the allocated power so that the EPS capacity is not exceeded. In addition, the priority of power being distributed may be determined and utilized. For example, suppose both switches were drawing power defined as low priority. If the second switch were to suddenly need 100 watts of high priority power, the system would demand that the first switch reduce its power consumption as necessary to allow the second switch to take the needed high priority power.

Figure 2:
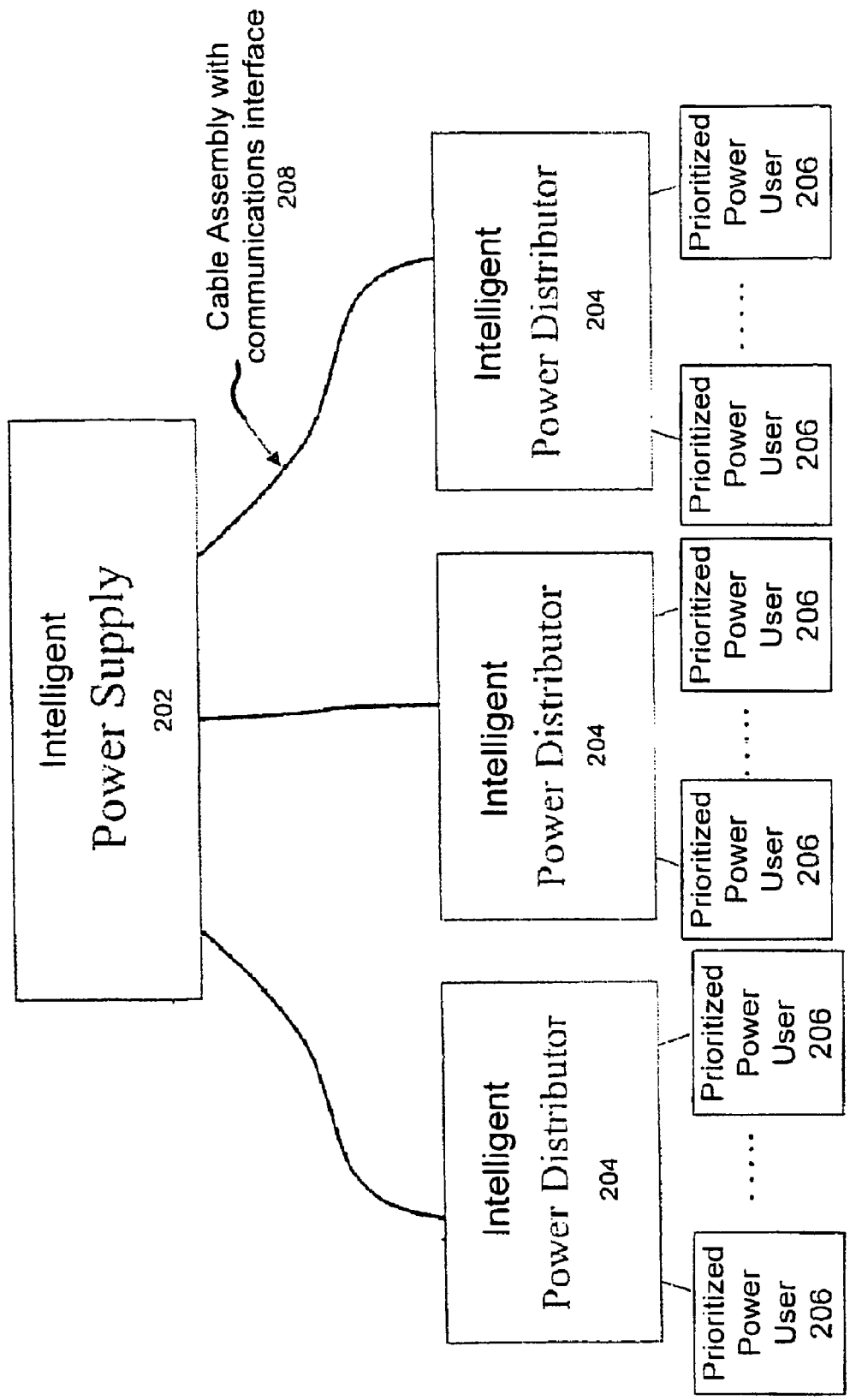
FIG. 2 is a block diagram depicting a system for distributing power in accordance with an embodiment of the invention.

FIG. 2 is a block diagram depicting a system 200 for distributing power in accordance with an embodiment of the invention. The components and interactions in this system 200 differ substantially from those in the conventional system 100 of FIG. 1. The system 200 of FIG. 2 includes an intelligent external power supply (EPS) 202, multiple intelligent power distributors (PDs) 204 coupled to the intelligent EPS 202, and multiple prioritized power user devices 206 coupled to each intelligent PD 202. The intelligent EPS 202 and intelligent PDs 204 are connected by way of a cable assembly 208 having a digital communications interface. The digital communications interface may comprise, in one embodiment, a low-frequency serial interface.

One embodiment of the intelligent EPS 202 is described further below in relation to FIG. 3. In general, the intelligent EPS 202 may be configured to provide power depending on requested quantities of power, where the power requests are received from the intelligent power distributors 204 by way of the aforementioned digital communications interface. The intelligent EPS 202 may also be configured with the capability to detect whether the load from an intelligent PD 204 is exceeding an authorized amount for that distributor.

One embodiment of an intelligent PD 204 is described further below in relation to FIG. 4. In general, the intelligent PD 204 may be configured to determine amounts and prioritization of power requested by (or assigned to) the power user devices 206.

Figure 3:
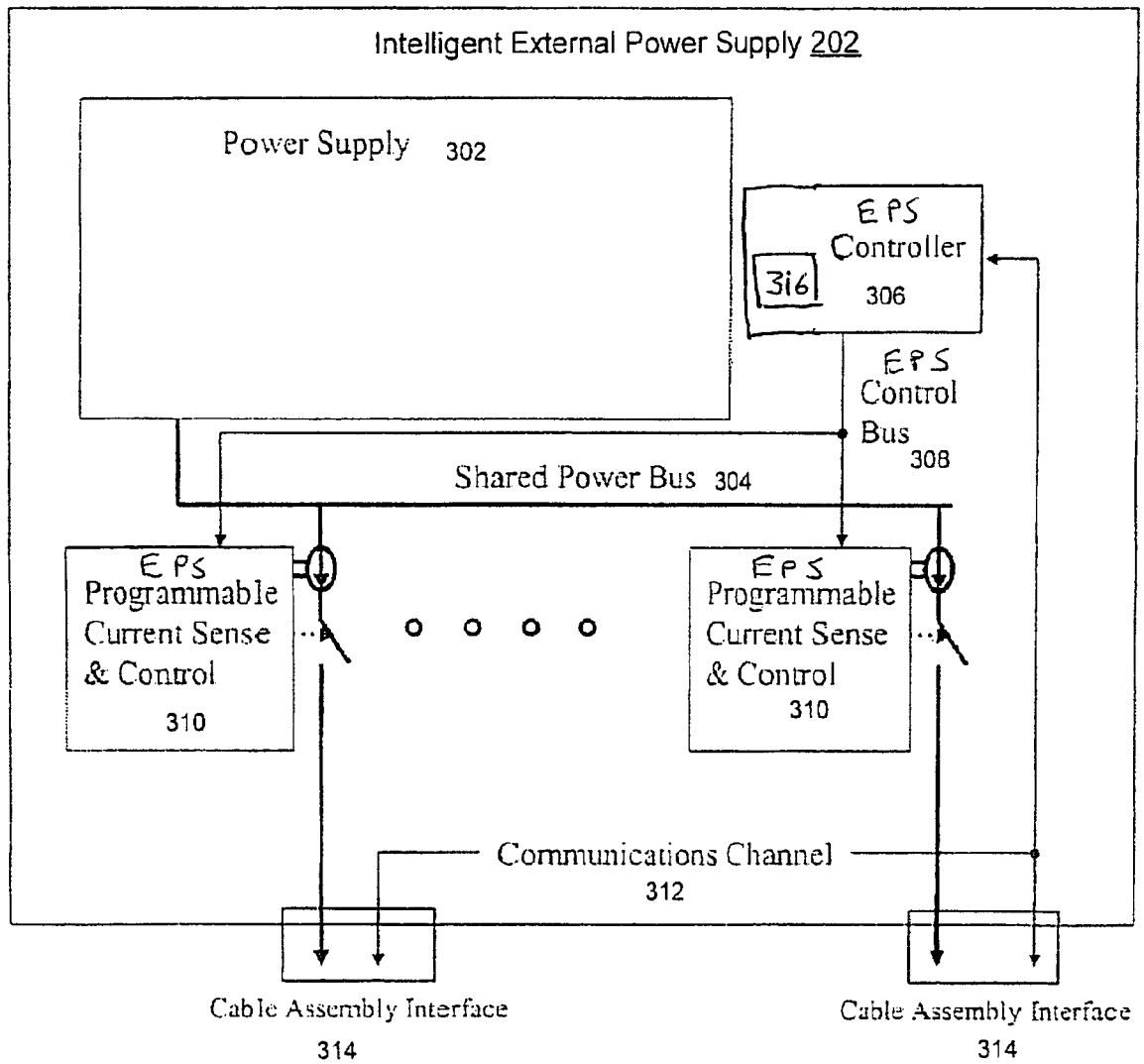
FIG. 3 is a diagram of an intelligent power supply in accordance with an embodiment of the invention.

FIG. 3 is a diagram of an intelligent power supply 202 in accordance with an embodiment of the invention. The intelligent power supply 202 comprises an external power supply to the intelligent power distributors 204. The intelligent external power supply (EPS) 202 includes a power supply 302, a shared power bus 304, a EPS controller 306, a EPS control bus 308, EPS programmable current sense and control units 310, and a communications channel 312, and a cable assembly interface 314.

The power supply 302 of the intelligent power supply 202 may be configured so as to be optimized for distribution within a low form factor and a low cost. In other words, the internal power supply 302 need not be capable of simultaneously providing full power to all user devices 206 connected via the intelligent power distributors 204 to the intelligent power supply 202.

The shared power bus 304 couples the power supply 302 to each of the EPS programmable current sense and control units 310. Each EPS programmable current sense and control unit 310 couples to an output port comprising a cable assembly interface 314. Each cable assembly interface 314 connects to a corresponding cable assembly with communications interface 208.

Each EPS programmable current sense and control unit 310 senses current to the corresponding output port and includes a switch to open or close the electrical connection from the shared power bus 304 to the corresponding output port. The current sensing may be performed by measuring a voltage across a low resistance element, and the switch may comprise, for example, a field effect transistor (FET) switch.

The EPS controller 306 is coupled via the EPS control bus 308 to each of the EPS programmable current sense and control units 310. The EPS controller 306 comprises a processor and associated memory and is used to control the EPS programmable current sense and control units 310 and other components (such as a fan and so on). The memory may include an external power supply table (EPS table) 316 that includes, for example, amounts and priority levels of power for each output port of the intelligent power supply 202.

The EPS controller 306 is also coupled to each of the output ports by way of a communications channel 312. For example, the communications channel 312 may comprise a serial communications channel or other digital communications channel. The communications channel 312 may be used, for example, to receive power requests from and power allocations to the intelligent power distributors 204.

In accordance with an embodiment of the invention, if a power distributor 204 coupled to one of the output ports draws more current than it is allocated or authorized to draw, then the corresponding programmable current sense and control unit 310 may be utilized to switch off power to that power distributor 204.

Figure 4:
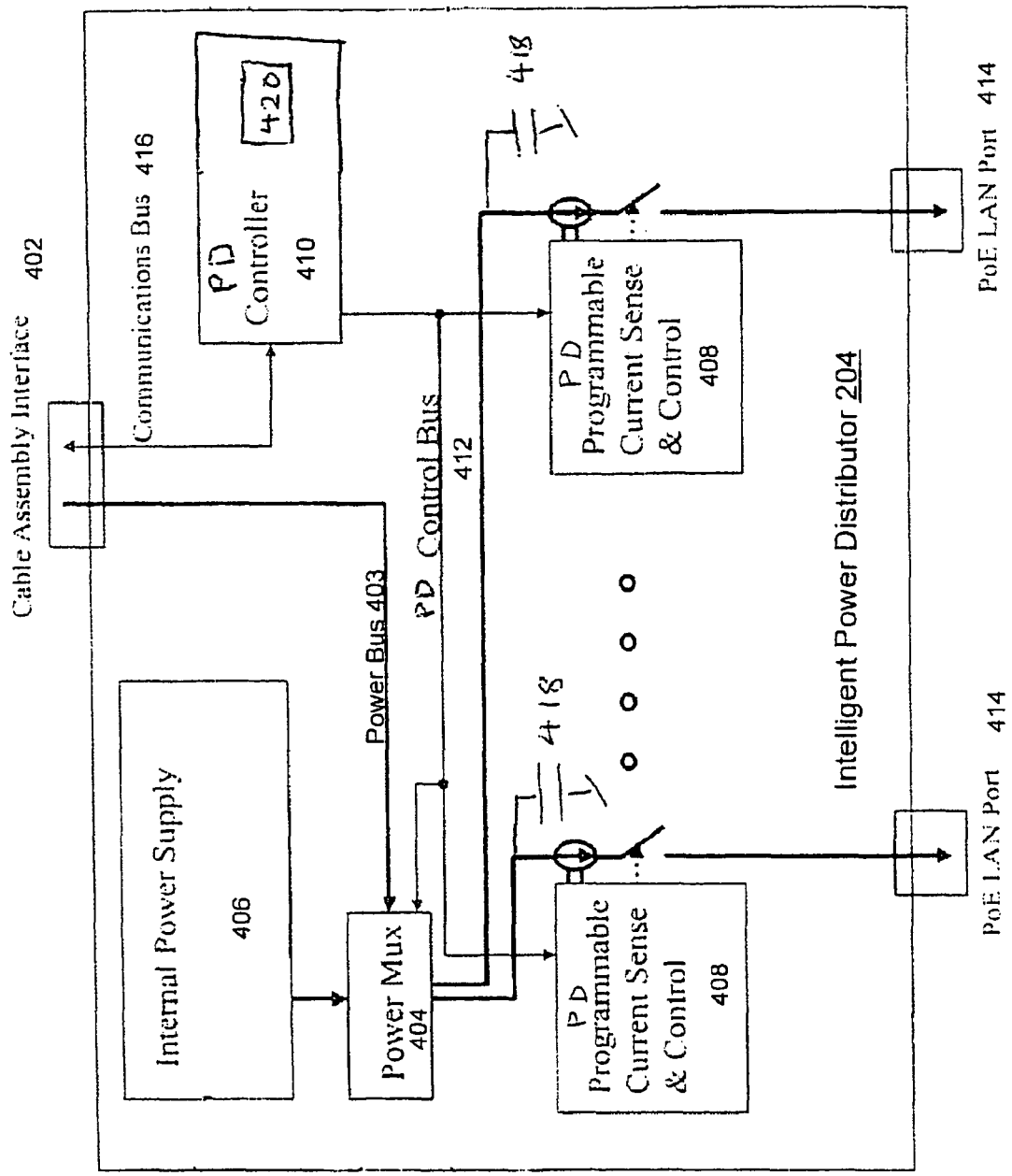
FIG. 4 is a diagram of an intelligent power distributor in accordance with an embodiment of the invention.

FIG. 4 is a diagram of an intelligent power distributor (PD) 204 in accordance with an embodiment of the invention. The intelligent PD 204 includes a cable assembly interface 402, a power bus 403, a power multiplexer 404, an internal power supply 406, PD programmable current sense and control units 408, a PD controller 410, a PD control bus 412, and LAN ports 414. In accordance with one embodiment of the invention, the power distributor 204 may comprise a network local area network (LAN) switch.

The internal power supply 406 within an intelligent power distributors 204 may be configured so as to be optimized for distribution within a low form factor and a low cost. In other words, the internal power supply 406 need not be capable of providing full power to all user devices 206 simultaneously. For example, an intelligent power distributor 204 may include, for example, 200 "Power over Ethernet" ports, each of which may provide up to 15 watts to a user device 206. In accordance with an embodiment of the invention, the intelligent power distributor 204 may be configured with an internal power supply with a capacity that is substantially less than 200×15=3,000 watts.

The cable assembly interface 402 of the intelligent power distributor 204 couples via a cable assembly with communications interface 208 to a corresponding cable assembly interface 314 of the intelligent power supply 202. The power lines from the cable assembly are coupled via the power bus 403 to an input of the power multiplexer (mux) 404. The internal power supply 406 is also coupled to an input of the power mux 404.

The power mux 404 is controlled by the PD controller 410 via the PD control bus 412. In accordance with one embodiment of the invention, the PD mux 404 is controllable so as to switch available power (from the power bus 403 and/or the internal power supply 406) to the ports 414 of the intelligent PD 204. For example, the intelligent PD 204 may comprise a network switch with two banks (left bank and right bank) of twelve LAN ports 414 each. In one specific implementation, the power mux 404 may be controllable so as to switch power from the internal power supply 406 to the left bank, to the right bank, or to both banks of ports. Similarly, the power mux 404 may be controllable so as to switch power from the external power supply 202 (via the power bus 403) to the left bank, to the right bank, or to both banks of ports. Of course, in other implementations, more than two banks may be used, and the banks may have other numbers of ports.

Each PD programmable current sense and control unit 408 senses current to the corresponding port 414 and includes a switch to open or close the electrical connection from the power mux 404 to the corresponding port 414. The current sensing may be performed by measuring a voltage across a low resistance element, and the switch may comprise, for example, a field effect transistor (FET) switch.

The PD controller 410 is coupled via the PD control bus 412 to each of the PD programmable current sense and control units 408. The PD controller 410 comprises a processor and associated memory and is used to control the PD programmable current sense and control units 408, the power mux 404, and other components (such as a fan and so on). The memory may include a power distributor table (PD table) 420 that includes, for example, amounts and priority levels of power for each port 414 of the intelligent PD 204.

In accordance with an embodiment of the invention, the priority level of power for each port 414 is dependent on the identity or type of network device 206 connected to the port 414. For example, higher priority devices may include IP-enabled telephone devices. As another example, higher priority devices may include wireless access ports. In accordance with another embodiment, the priority levels of power for the ports 414 may be configurable into the PD table by a network administrator.

The PD controller 410 is also coupled to each of the cable assembly interface by way of a communications bus 416. For example, these communications may comprise serial communications or other digital communications. The communications bus 416 may be used, for example, to send power requests to and power allocations from the intelligent power supply 202.

In accordance with an embodiment of the invention, if a user device 206 coupled to one of the ports 414 draws more current than it is allocated or authorized to draw, then the corresponding PD programmable current sense and control unit 408 may be utilized to switch off power to that user device 206. In one implementation, capacitors 418 are advantageously coupled to the power lines going to each port 414. These capacitors 418 may be used to prevent a temporary surge of power drawn from one port 414 from adversely affecting the user devices 206 coupled to the other ports 414.

Figure 5:
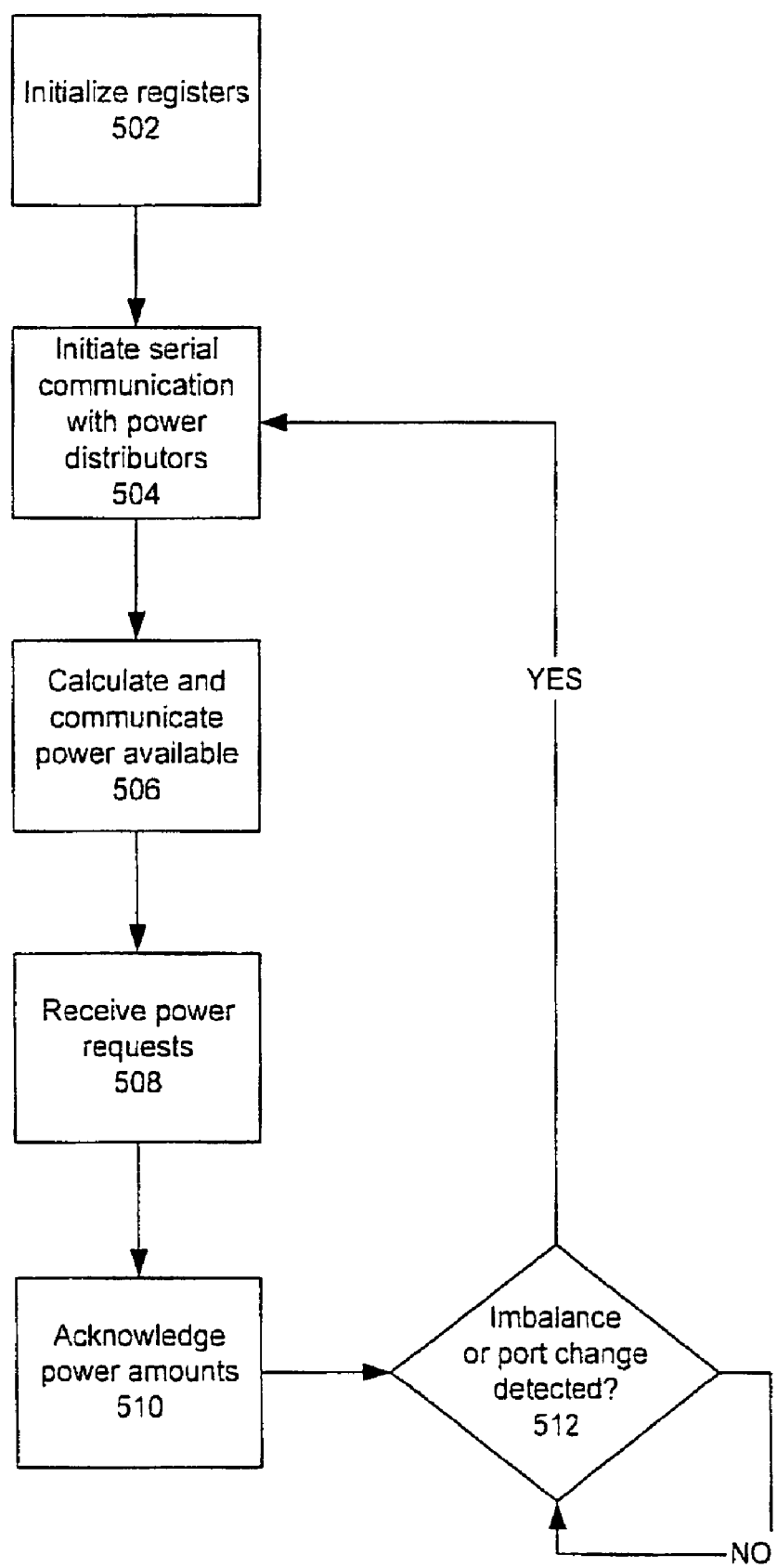
FIG. 5 is a flow chart depicting a method of power authorization by an intelligent power supply in accordance with an embodiment of the invention.

FIG. 5 is a flow chart depicting a method 500 of power authorization by an intelligent EPS 202 in accordance with an embodiment of the invention. In a preliminary step, registers within the intelligent EPS 202 may be initialized 502 to set the registers to their default values.

Serial (or other digital) communication between the intelligent EPS 202 and the intelligent PDs 204 is then initiated 504. For example, the initiation 504 of communication may be implemented by the intelligent PD 204 pulsing an interrupt signal to indicate that it is ready to communicate, or by a handshake between each intelligent PD 204 and the intelligent EPS 202.

The intelligent EPS 202 calculates and communicates 506 the power available per port to the intelligent PDs 204. The communication is performed by way of the digital communication channel therebetween. In one implementation, the calculation may comprise simply dividing a total power capacity of the EPS 202 by the number of output ports with intelligent PDs 204 connected thereto. For example, if the power capacity of the EPS 202 is 600 watts, and four output ports have power distributors 204 connected thereto, then the power available per port is calculated to be 600 watts/4 PDs=150 watts per PD. In an alternate embodiment, the total power available may be communicated instead of the power available per port.

The intelligent EPS 202 then receives 508 power requests from the intelligent PDs 204. These power requests may include an amount of power requested at each priority level from each intelligent PD 204. For example, each intelligent PD 204 may determine amounts and priority levels of power for the network devices 206 connected thereto, sum together the amounts at each priority level, determine additional amounts and priority levels of power required beyond the internal power supply 406 capability, and send a power request with these additional amounts and priority levels of power to the intelligent EPS 202.

In one embodiment, the intelligent PDs 204 may advantageously arbitrate amongst themselves in the process of generating the power requests. A high-level process for such arbitration is described below in relation to FIG. 6. In an alternate embodiment of the invention, the power requests may be generated individually by the intelligent PDs 204 (without mutual interactive arbitration therebetween). In such an embodiment, the intelligent EPS 202 may be configured to apply an algorithm that allocates the available power to the higher priority requests without exceeding the total capacity of the EPS 202.

After receiving the power requests from all the intelligent PDs 204, the intelligent EPS 202 totals the requested amounts to check as to whether the total requested amount is within the total capacity of the EPS 202. If so, then the power requests are acknowledged 510 by the EPS 202 sending acknowledgement messages to the PDs 204. The acknowledgement message indicates the power being authorized and allocated to each PD 204. If the total capacity is exceeded by the total requested amount, then, in one embodiment, the intelligent EPS 202 applies an algorithm that allocates the available power to the higher priority requests without exceeding the total capacity of the EPS 202.

The system 200 thus allocates power from the intelligent EPS 202 to the intelligent PDs 204. Subsequently, the system is configured to detect an imbalance or port change. For example, an imbalance may occur if one PD 204 begins to draw power beyond its authorized and allocated amount. A port change refers to the addition or removal of a PD 204 from the ports of the EPS 202. If an imbalance or port change is detected at 512, then the method 500 loops back to the step where communication between the EPS 202 and PDs 204 is initiated 504, and the method 500 continues on from there to re-allocate the available power.

Figure 6:
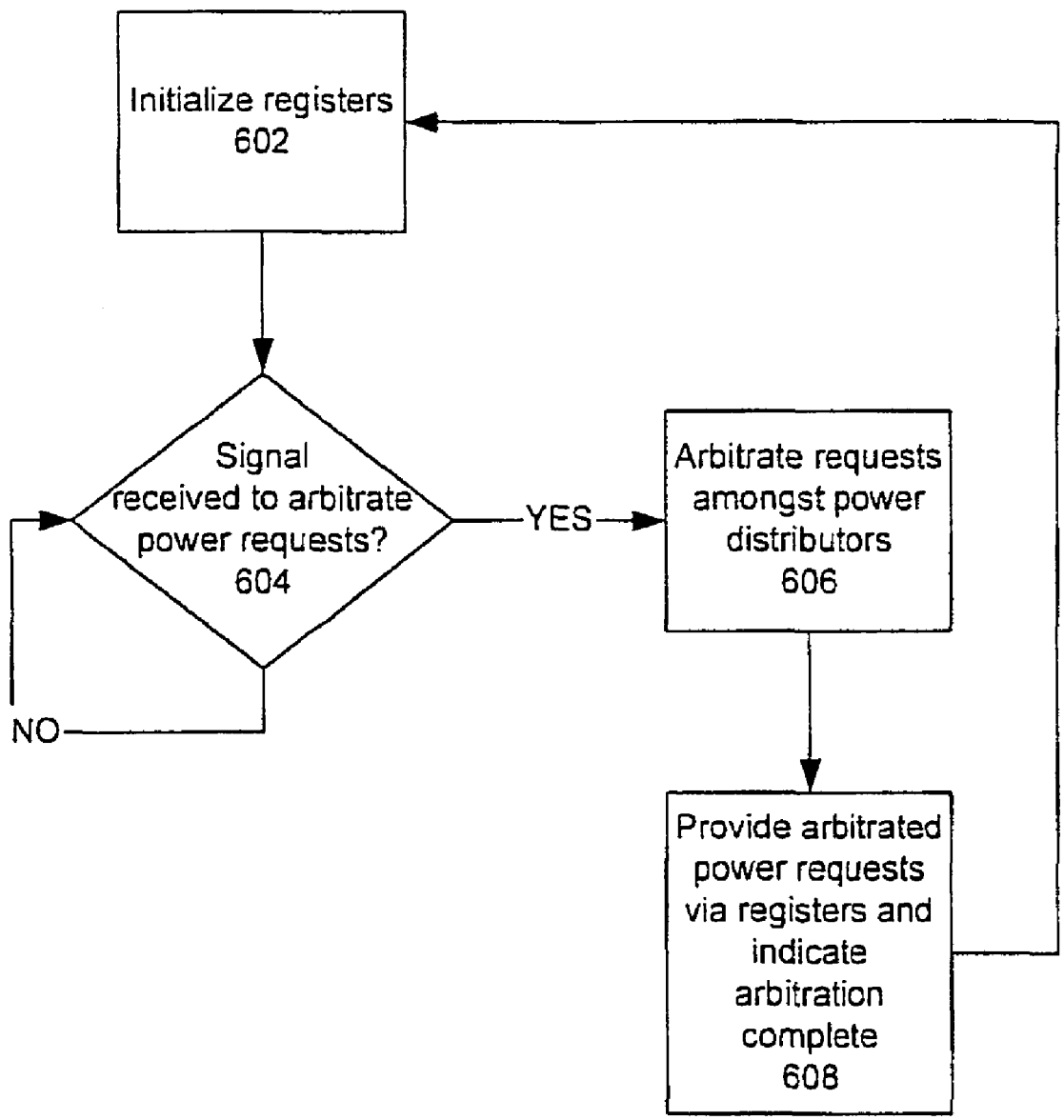
FIG. 6 is a flow chart depicting a method of generating power requests by intelligent power distributors using arbitration in accordance with an embodiment of the invention.

FIG. 6 is a flow chart depicting a method 600 of generating power requests by intelligent power distributors 204 using arbitration in accordance with an embodiment of the invention. In a preliminary step, registers within each intelligent PD 204 may be initialized 602 to set the registers to their default values.

The intelligent PDs 204 await and look for a signal to arbitrate power requests. When such an arbitration signal is received 604, then the intelligent PDs 204 arbitrate power requests amongst themselves. The arbitration messages may be communicated by way of the digital communications channels linking the PDs 204 to the EPS 202, or they may be communicated by way of separate communication channels (not illustrated) between the PDs 204.

In one embodiment, the arbitration 606 may be implemented using a master-slave arbitration algorithm. In such an embodiment, one PD 204 is designated as the master, and the other PDs 204 are designated as slaves. Various master-slave arbitration algorithms are known to those of skill in the pertinent art, and it is contemplated that the scope of the invention should encompass various master-slave arbitration algorithms. In an alternate embodiment, the arbitration 606 may be implemented using a peer-to-peer arbitration algorithm. In such an embodiment, none of the PDs 204 is designated as the master. Various peer-to-peer arbitration algorithms are known to those of skill in the pertinent art, and it is contemplated that the scope of the invention should encompass various peer-to-peer arbitration algorithms.

Once the arbitration 606 is complete, then the arbitrated power requests are provided 608 from the intelligent PDs 204 to the intelligent EPS 202. Specific registers may be used to provide the power requests. Thereafter, the process 600 may loop back to initialize 602 the registers and await 604 another arbitration signal.

In one alternate embodiment of the invention, the intelligent EPS 202 and the multiple intelligent PDs 204 may be integrated together in a single power distribution unit or chassis. In this embodiment, the EPS 202 would no longer be "external", rather it would be internal to the unit. The multiple PDs 204 would then comprise subunits of the integrated power distribution unit. Such an integrated power distribution unit would be advantageously intelligent and flexible in distributing its available power on a prioritized basis.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of power distribution of direct current (DC) power over twisted pair cabling to network devices, the method comprising:
    determining amounts and priority levels of power for the network devices connected via said twisted pair cabling to each ethernet switch of a plurality of ethernet switches;
    summing together the amounts at each priority level at each said ethernet switch of said plurality of ethernet switches;
    determining additional amounts and priority levels of power required beyond a capability of an internal power supply of each said ethernet switch of said plurality of ethernet switches; and
    communicating a power request to an external power supply for the additional amounts and priority levels of power required beyond the capability of the internal power supply of each said ethernet switch of said plurality of ethernet switches.

2. The method of claim 1, further comprising allocating power by the external power supply to the ethernet switches depending on the communicated power request.

3. The method of claim 1, wherein available power and power requests are communicated using a serial data connection between the external power supply and each said ethernet switch.

4. The method of claim 1, further comprising:
    arbitration between the ethernet switches to determine the power request.

5. The method of claim 4, wherein the arbitration comprises a master-slave arbitration procedure.

6. The method of claim 4, wherein the arbitration comprises a peer-to-peer arbitration procedure.

7. A method of distributing direct current (DC) power to network devices over twisted pair cabling, the method comprising:
    associating an amount and priority level of power for each device of said devices connected via said twisted pair cabling to a port of a network switch;
    maintaining in the switch a table of the amount and priority level for each switch port;
    summing together the amounts of power for the devices connected to the network switch;

determining additional amounts and priority levels of power required beyond a capability of an internal power supply in the network switch;

communicating a power request to an external power supply for the additional amounts and priority levels of power required beyond the capability of the internal power supply in the network switch; and using the table to allocate available power to higher priority devices when insufficient power is available to fully power all of the connected devices.

8. The method of claim 7, wherein the allocation of power is controlled using current control switches connected to the switch ports.

9. The method of claim 8, wherein the allocation of power is further controlled using a power multiplexer circuit which is configured to connect to the internal power supply within the switch and to the external power supply.

10. The method of claim 8, further comprising:

detecting actual power amounts drawn by the network devices using current sensors coupled to the switch ports.

11. The method of claim 10, wherein if an actual power drawn from a specific port exceeds authorized power to that port, then the current switch associated with the port is open to halt the power drawn therefrom.

12. The method of claim 7, wherein the priority level of power for a switch port depends on which type of network device is connected to the port.

13. The method of claim 12, wherein the higher priority devices include IP-enabled telephone devices.

14. The method of claim 12, wherein the higher priority devices include at least one wireless access point.

15. The method of claim 7, wherein the priority levels of power for switch ports are manually configurable into the table by a network administrator.

* * * * *